United States Patent [19]

Betker et al.

[11] Patent Number: 5,566,900
[45] Date of Patent: Oct. 22, 1996

[54] CABLE TAKEUP/PAYOUT SYSTEM FOR A MULTI-ROTATION ASSEMBLY

[75] Inventors: Jay B. Betker; Anthony J. Scalise, both of Yorba Linda; William E. Odor, Downey, all of Calif.

[73] Assignee: Hughes Aircraft Company, Los Angeles, Calif.

[21] Appl. No.: 351,847

[22] Filed: Dec. 8, 1994

[51] Int. Cl.$^6$ .......................... B65H 75/00; H01R 39/00
[52] U.S. Cl. ...................... 242/388; 242/407; 439/15
[58] Field of Search ........................ 242/388, 388.6, 242/378, 407, 613.2, 587.2, 587.3, 402; 439/13, 15

[56] References Cited

U.S. PATENT DOCUMENTS 5,328,112  7/1994  Obata ............................ 242/388
5,332,171  7/1994  Steff ............................ 242/388.6

Primary Examiner—John M. Jillions
Attorney, Agent, or Firm—Jeannette M. Walder; Wanda K. Denson-Low

[57] ABSTRACT

A cable connection/dispensing system for a multi-rotation assembly includes a hollow cylindrical housing and an elongated central hub centered within the housing. The hub has a cardioid cross-sectional shape with two lobes and an acute cusp therebetween. At least one of the housing and the hub is rotatable. A first cable connector is located on the hollow housing and faces its interior, and a second cable connector is located at the acute cusp of the central hub. A length of an interconnect medium lies between the hollow housing and the central hub. The interconnect medium includes an interconnect cable attached at a first end to the first cable connector and at a second end to the second cable connector, and an interconnect medium substrate to which the interconnect cable is attached. Rotation of the hub with respect to the housing results in a smooth payout and takeup of the cable medium for a number of turns corresponding to about twice the length of the interconnect medium.

16 Claims, 3 Drawing Sheets

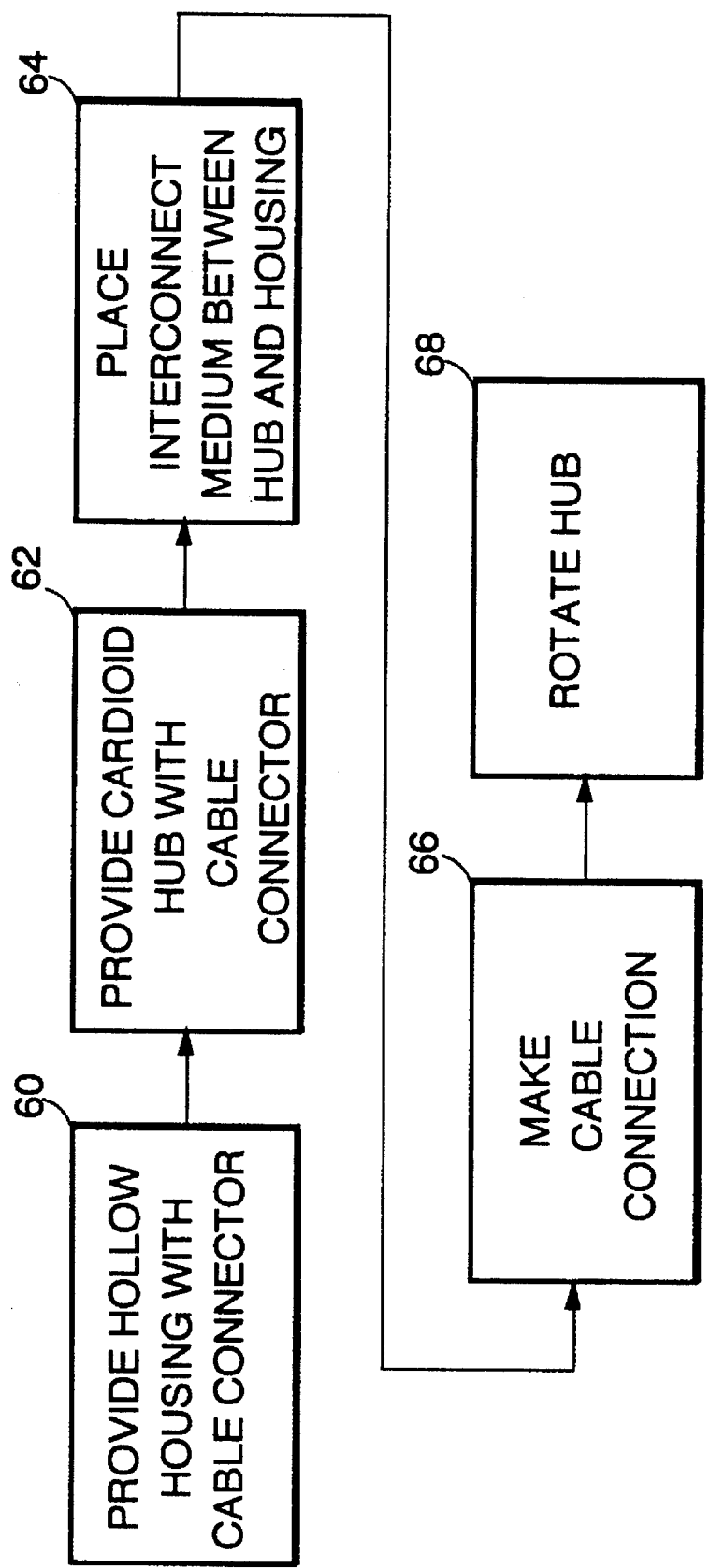

CABLE TAKEUP/PAYOUT SYSTEM FOR A MULTI-ROTATION ASSEMBLY

BACKGROUND OF THE INVENTION

This invention relates to a cable connection for a rotational assembly designed to permit a limited number of rotational turns, and, more particularly, to the structure promoting efficient cable takeup and payout.

Many industrial designs utilize structures wherein one component rotates relative to another, and wherein the rotating component requires a power, instrumentation, optical fiber, fluid, or other type of hookup connection to the non-rotating component. Some such structures require an infinite relative rotational capability. In these cases a hookup connection can be made using sliding contacts or rotational connectors.

Other structures require only the capability of some finite number of relative rotations, which is herein termed a "multi-rotation assembly". In the case of a multi-rotation assembly, power, instrumentation, fluid, or other hookup connection between the rotating and non-rotating components can be conveniently made with a cable that is wound and unwound during the rotational movement. A cable has the advantage over sliding contacts or rotational connectors of reduced chances of failure due to bad contacts or connector failure, less noise in the case of an electrical connection, and less likelihood of leakage in the case of a fluid rotational coupler. The present invention is concerned with such a multi-rotation assembly.

In providing cable hookup connections in multi-rotation assemblies, it is well known to provide a central hub that is rotatable within a hollow housing. A cable is connected at one end to the hub and at the other end to the housing, and is circumferentially wrapped in the space between the outside surface of the hub and the inside surface of the housing. The cable is payed out as the hub is rotated in one rotational direction (e.g., clockwise rotation) and taken up as the hub is rotated back in the other rotational direction (e.g., counterclockwise rotation). Care is taken to avoid twisting or kinking of the cable, and to ensure a smooth, repeatable unwinding and winding of the cable. The length of the cable corresponds to the length required to supply the number of rotations for which the hub is designed. A number of designs have been developed to accomplish these objectives.

While operable in many situations, the available approaches have some shortcomings. The space between the hub and the housing limits the amount of cable that can be wound. Consequently, the number of rotations permitted for the hub is often limited by the permitted length of cable, particularly where the cable is of relatively large diameter such as a Dower cable or hydraulic cable. Existing designs therefore limit the number of available rotational turns to less than that needed for some applications. The cable may itself be expensive, and the present deigns require more cable than is desirable.

There is a need for an improved takeup/payout system for cables in multi-rotational systems. The present invention fulfills this need, and further provides related advantages.

SUMMARY OF THE INVENTION

The invention provides an approach for cable connection and dispensing (i.e., payout and takeup) in a multi-rotation assembly. Smooth dispensing of various types of cable is achieved. The apparatus is compact, yet it permits the use of a long length of cable that in turn provides the capability of many rotations. The full length of cable is usable in both rotational directions from a rotational midpoint, yielding about twice the rotational range available for other cable dispensing systems. Alternatively, a lesser length of possibly expensive cable is required to achieve a required rotational range, as compared with other systems.

In accordance with the invention, a cable connection/dispensing system for a multi-rotation assembly comprises a hollow housing and a central hub centered within the housing and having a cross-sectional shape with two lobes and an acute cusp therebetween. At least one of the housing and the hub, typically the hub, is rotatable. A first cable connector is located on the hollow housing and faces an interior thereof, and a second cable connector is located on the central hub. An interconnect medium is disposed between the hollow housing and the central hub. The interconnect medium comprises an interconnect cable attached at a first end to the first cable connector and at a second end to the second cable connector.

A feature of the present approach is the ability of a traveling loop in the interconnect medium to controllably buckle and invert during rotation of the hub or housing. This inversion permits the interconnect medium to extend to its full length in each direction of rotation of the hub or housing about the rotational midpoint, effectively doubling the rotational range. The inversion is attained through the use of the hub having lobes and an acute cusp between the lobes. Preferably, the hub is a cardioid with smooth surfaces except at the cusp, and the housing is a cylinder.

The interconnect medium includes the interconnect cable, but may also include an interconnect medium substrate to which the cable is attached. The elastic properties of the interconnect medium substrate may be tailored to promote the inversion of the traveling loop during dispensing. Various types of cables, such as electrical power, instrumentation, optical fiber, and fluid cables may therefore be used with the present approach, with their mechanical properties modified to be consistent with the dispensing requirements by the addition of the interconnect medium substrate where necessary.

The present invention provides an advance in the art of cable connection and dispensing systems for use in multi-rotation assemblies, where a finite number of rotational turns is required. Cable utilization is higher than in prior designs, permitting a larger rotational range than in prior designs. Other features and advantages of the present invention will be apparent from the following more detailed description of the preferred embodiment, taken in conjunction with the accompanying drawings, which illustrate, by way of example, the principles of the invention.

BRIEF DESCRIPTION OF THE DRAWINGS

FIGS. 3–6 are a series of schematic end-on elevational views of the multi-rotational assembly of FIG. 1 as the hub rotates from one rotational extremum toward the rotational midpoint, wherein FIG. 3 depicts the hub at a counterclockwise rotational extremum, FIG. 4 depicts the hub after several clockwise rotations, FIG. 5 depicts the hub nearing the rotational midpoint as interconnect medium inversion begins, and FIG. 6 depicts the hub after a further quarter turn with rotational inversion halfway completed; and FIG. 7 is a block flow diagram for a method practiced according to the invention.

DETAILED DESCRIPTION OF THE INVENTION

Figure 1:
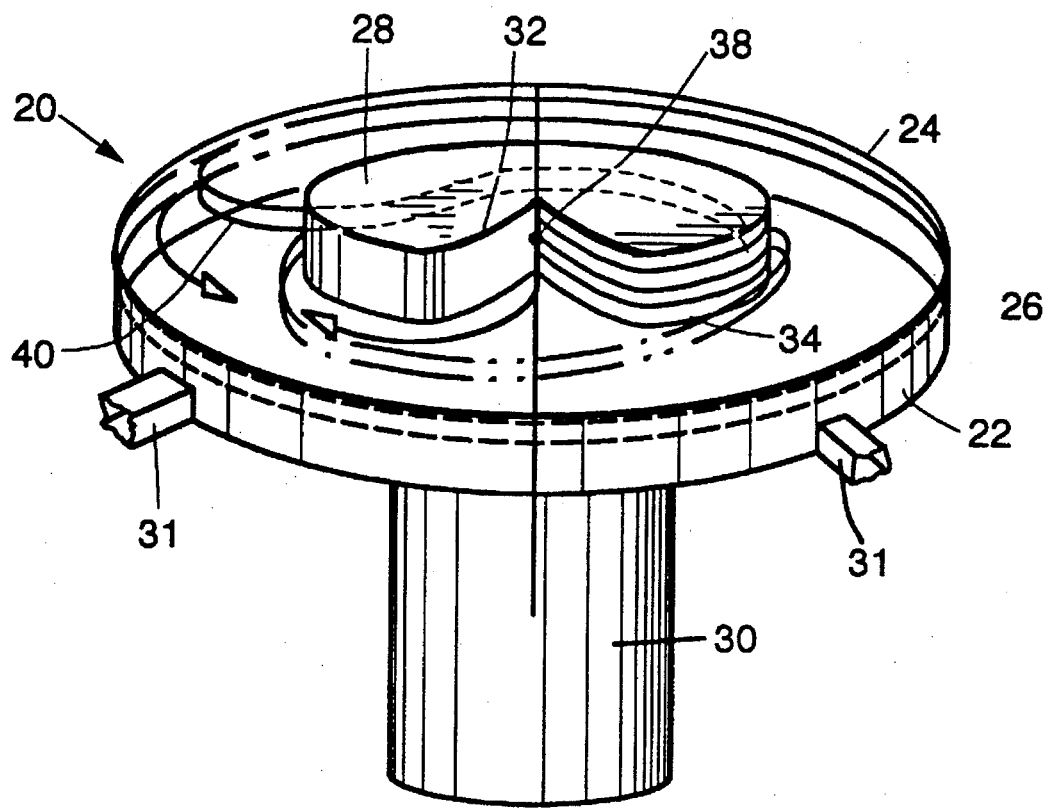
FIG. 1 is a schematic perspective view of a multi-rotational assembly using the cable connection and dispensing approach of the invention.

FIG. 1 depicts a system 20 for cable connection and dispensing according to a preferred embodiment of the present invention. The system 20 includes a hollow housing 22, which is preferably cylindrical with a relatively short cylindrical length as compared with the cylindrical diameter. The housing 22 has a first cable connector 24 located on an inwardly facing surface of a wall 26 of the housing 22. The cable connector 24 is depicted schematically in the figures, as it may be of any required type corresponding to the cable requirements. For example, the cable connector 24 may be an electrical power connector, a multipin electrical instrumentation connector, an optical fiber connector, a fluid pressure connector, or a fluid flow connector.

A central hub 28 is centered within the housing 22. Either the housing 22, the hub 28, or both are provided with rotational movement. In the preferred embodiment, the hub 28 is rotated about a rotational axis by a reversing motor 30, which is provided with bearings for supporting the hub 28 and appropriate speed and direction controls. For example, the motor 30 may be a bidirectional stepping motor. The hub may also be driven indirectly by being linked, as with a shaft, gears, or a belt, to other rotating elements of the system (not shown). In this preferred embodiment, the housing 22 is maintained stationary by its attached structure, indicated schematically at numeral 31.

In a cross-sectional view, as in FIGS. 3–6, the hub 28 has an acute cusp 32 therein, preferably positioned between two lobes 34 and 36. As used herein, an "acute" cusp is one where the angle subtended by the open area of the cusp is less than 180°. In a preferred form, the hub 28 has the shape of a cardioid when sectioned perpendicular to the rotational axis. A cardioid naturally has a pair of lobes with an acute cusp therebetween.

The ratio of the diameter of the hub 28 to the inner diameter of the housing 22 is typically about ⅓ to about ½. In a working embodiment of the system 20, the housing 22 was a cylinder with an inner diameter of 20.5 inches and the hub was a cardioid inscribed in a cylinder of diameter about 8.5 inches. (The "diameter" of the hub, which itself is not a cylinder, is defined as the diameter of a cylinder in which the hub is inscribed.)

A second cable connector 38 is located on the central hub 28, preferably within the area of the cusp 92, and most preferably at the point of the cusp 32. The second cable connector 38, like the first cable connector 24, is selected to be compatible with the type of cable used.

A cable interconnect medium 40 is disposed in the space between the housing wall 26 and the hub 28. The interconnect medium 40 includes an interconnect cable having a first end that is attached to the first cable connector 24 and a second end that is attached to the second cable connector 38. The interconnect cable is preferably of sufficient length that it will accommodate about half of the total rotational range of the hub 28.

Figure 2:
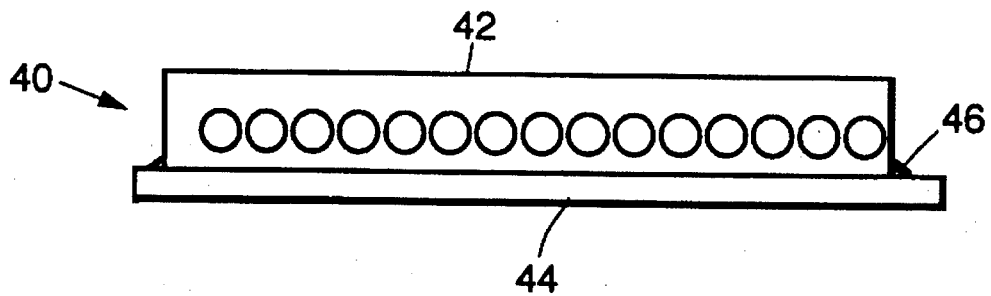
FIG. 2 is a schematic cross sectional view of a cable interconnect medium.

A preferred form of the interconnect medium 40 is shown in FIG. 2. A cable 42 of the required type is included. In FIG. 2, the cable 42 is an electrical instrumentation cable with multiple electrical leads, but it could be of any other type. More than one cable could be provided. The cable 42 may be attached to an optional interconnect medium substrate 44 by a bead of adhesive 46. The interconnect medium substrate supports the cable 42 and adds to its strength. The interconnect medium substrate 44 is desirably made of a thin strip of a material such as polytetrafluoroethylene (teflon), which has a low frictional coefficient against the housing wall 26 and the hub 28.

Additionally, the choice of the interconnect medium substrate material and its dimensions can be used to adjust the mechanical properties of the interconnect medium 40, if necessary. As will be discussed subsequently, a traveling loop inversion of the interconnect medium 40 during cable dispensing is used to achieve more complete utilization of the cable length than heretofore possible. The elastic properties of the cable interconnect medium 40 aid in achieving the inversion by establishing the column buckling strength of the interconnect medium at the point that it is to invert.

Figure 3:
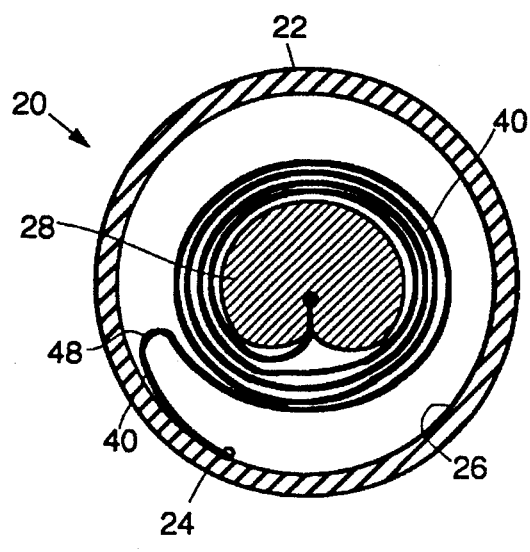
Figure 4:
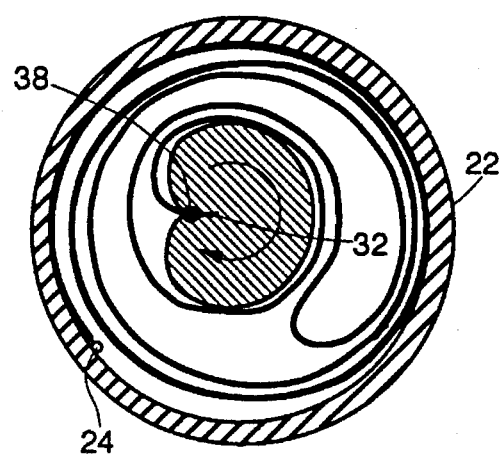

FIGS. 3–6 depict a portion of the sequence of events during the dispensing of the interconnect medium 40. In particular, FIG. 3 shows the hub 28 at a full counterclockwise rotational extremum. Most of the cable interconnect medium 40 is coiled around the hub 28, with a remaining first loop 48 of the interconnect medium 40 residing between the housing 22 and the hub 28. FIG. 4 depicts the system 20 after the hub 28 has rotated clockwise for several rotations. Most of the interconnect medium 40 has been unwound from the hub 28 to lie against the inner wall 28 of the housing 22. The smooth, controlled transfer of the interconnect medium 40 from the hub 28 to lie against the wall 26 is accomplished by the planetary movement of the first loop 48 around the hub 28, in the space between the hub 28 and the housing 22. The first loop 48 is therefore properly termed a traveling first loop. The traveling first loop leads the cusp 32 as it travels. That is, the traveling first loop 48 is pushed ahead of the cusp and the second cable connector 38 as the hub 28 rotates, causing the interconnect medium to be unwound from the hub and wound onto the inner wall of the housing.

Figure 5:
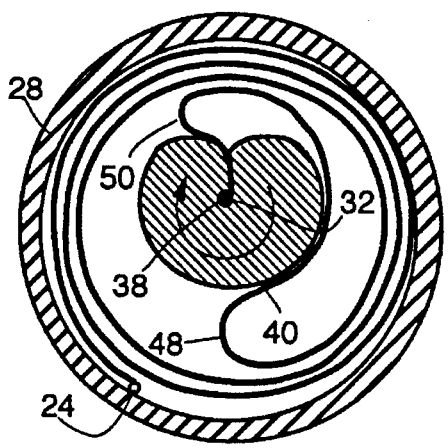

In FIG. 5, the hub 28 is approaching its rotational midpoint, the position where it has rotated halfway from its counterclockwise extremum to its clockwise extremum. By this point, there is nearly no further interconnect medium 40 to be unwound from hub 28. The applied force that pushes the first traveling loop 48 ahead of the rotation of the hub 28 subjects the side of the loop adjacent to the hub to column forces that exceed its column buckling strength, causing the affected interconnect medium 40 to buckle and form a second loop 50, which is also a traveling loop. The presence of the cusp 32 aids in achieving a controlled buckling and inversion of the cable interconnect medium from the stable first traveling loop to the stable second traveling loop. Without the cusp, it is not certain that the buckling and loop inversion behavior will always occur in a reliable manner.

Figure 6:
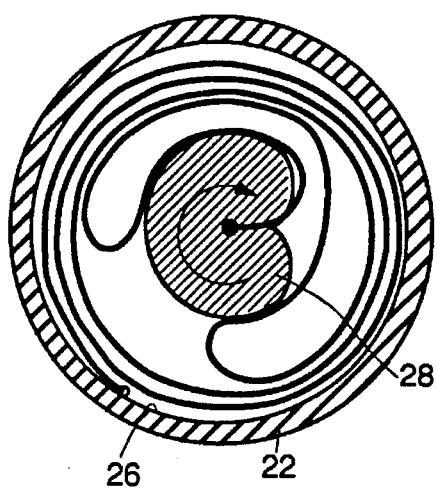

With continuing rotation of the hub 28, a further quarter turn as shown in FIG. 6, the first traveling loop 48 shrinks in size as its material is wound onto the inner wall 26 of the housing 22. After further rotation, the first traveling loop 48 disappears, leaving only the second traveling loop 50. This completes the inversion of the interconnect medium with the loop in a leading position to the loop in a trailing position. The second traveling loop 50 trails the cusp 32 as the hub 28 continues to rotate in the clockwise direction, causing the interconnect medium 40 that has been previously wound onto the inner wall 26 to be unwound from the inner wall and onto the hub 28. This process continues until the clockwise rotational extremum of the hub 28 is reached. At this point, the rotational direction of the hub 28 is reversed, resulting in a mirror-image-like repetition of the above-described sequence of FIGS. 3–6. (Upon reversal of the rotational direction of the hub, what was previously the second (trailing) traveling loop 50 transforms into the first (leading) traveling loop 48, because the loops are defined by their leading or trailing position with respect to the cusp.)

Thus, during a full traverse of the rotational range of the hub 28 from the fully counterclockwise position to the fully clockwise position, the cable interconnect medium is unwound from the hub onto the wall of the housing by the point that the hub reaches the rotational midpoint. The cable interconnect medium is thereafter unwound from the housing wall and back onto the hub as the hub moves to the fully clockwise position. The cable interconnect medium is therefore more fully utilized than if the loop inversion did not occur and the rotation had to be stopped at about the point shown in FIG. 5. Consequently, less cable is required for a specified range of rotation, or, alternatively, a larger range of rotation is possible for a given dimensional size of the system between the hub and the housing that defines the space available to hold the interconnect medium.

The above discussion of FIG. 3–6 has been for the case where the hub rotates over the full rotational range of the system. A similar sequence of events is followed if the hub is rotated only a portion of its range, rotation is halted, and then subsequently rotation is resumed in the same or the opposite direction.

A system 20 of the type illustrated in the drawings and described above has been built and tested. The diameter of the hub was 8.5 inches and the inner diameter of the housing was 20.5 inches. The cable 42 was a flat 15-conductor electrical cable as illustrated in FIG. 2, with a width of about 1½ inches, a height of about 0.060 inches, and a length of about 65 feet. The interconnect medium substrate 44 was a flat piece of polytetrafluoroethylene (teflon) about 1½ inches wide and about 0.020 inches thick. The system 20 was tested by cycling about 1000 times from the fully counterclockwise position to the fully clockwise position and back. Each cycle included about 25–30 rotations of the hub in each direction. The system operated smoothly and without any failures.

FIG. 7 illustrates a method for practicing the invention The system components are as discussed previously. The hollow housing 22 with its first cable connector 24 is provided, numeral 60. The cardioid hub 28 with its second cable connector 38 is provided, numeral 62. The interconnect medium 40 is wound into the space between the hub 28 and the housing 22, numeral 64. The cable connections are made, numeral 66. Rotation in the various modes previously discussed can then be undertaken, numeral 68.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A cable connection/dispensing system for a multi-rotation assembly, comprising:

a hollow housing;

a central hub centered within the housing and having a cross-sectional shape with two lobes and an acute cusp therebetween, at least one of the housing and the hub being rotatable;

a first cable connector located on the hollow housing and facing an interior thereof;

a second cable connector located on the central hub;

an interconnect medium disposed between the hollow housing and the central hub, the interconnect medium comprising an interconnect cable attached at a first end to the first cable connector and at a second end to the second cable connector; and means for rotating the central hub and for holding the housing stationary with respect to rotation, the means for rotating permitting a preselected number of rotations of the hub.

2. The system of claim 1, wherein the interconnect medium further comprises an interconnect medium substrate to which the interconnect cable is attached.

3. The system of claim 2, wherein the interconnect medium substrate is made of polytetrafluoroethylene.

4. The system of claim 1, wherein the interconnect cable is an electrical cable.

5. The system of claim 1, wherein the interconnect cable is a fluid conduit.

6. The system of claim 1, wherein the central hub has a cross-sectional cardioid shape.

7. The system of claim 1, wherein the length of the interconnect medium is sufficient to supply about one-half of the preselected number of rotations in either rotational direction.

8. The system of claim 1, wherein the ratio of the diameter of the hub to the inner diameter of the housing is from about ⅓ to about ½.

9. A cable connection/dispensing system for a multi-rotation assembly, comprising:

a hollow cylindrical housing;

an elongated central hub centered within the housing and having a cardioid cross-sectional shape with two lobes and an acute cusp therebetween, at least one of the housing and the hub being rotatable;

a first cable connector located on the hollow housing and facing an interior thereof;

a second cable connector located at the acute cusp of the central hub; and an interconnect medium disposed between the hollow housing and the central hub, the interconnect medium comprising:

an interconnect cable attached at a first end to the first cable connector and at a second end to the second cable connector, and an interconnect medium substrate to which the interconnect cable is attached.

10. The system of claim 9, wherein the interconnect medium has a length of at least the circumference of the outer housing.

11. The system of claim 9, wherein the interconnect medium substrate is made of polytetrafluoroethylene.

12. The system of claim 9, wherein the interconnect cable is an electrical cable.

13. The system of claim 9, wherein the interconnect cable is a fluid conduit.

14. The system of claim 9, further including means for rotating the central hub and for holding the housing stationary with respect to rotation.

15. The system of claim 9, wherein the ratio of the diameter of the hub to the inner diameter of the housing is from about ⅓ to about ½.

16. A method for connecting and dispensing a cable in a multi-rotation assembly, comprising the step of:

providing a hollow housing having a first cable connector located on the hollow housing and facing an interior thereof, providing a central hub centered within the housing and having a cross-sectional shape with two lobes and an acute cusp therebetween, the central hub having a second cable connector located thereon, at least one of the housing and the hub being rotatable;

placing a length of an interconnect medium between the hollow housing and the central hub, the interconnect medium comprising an interconnect cable attached at a first end to the first cable connector and at a second end to the second cable connector; and rotating the hub by a preselected number of rotations of the hub and while holding the housing stationary with respect to rotation.

* * * * *